April 30, 1963 T. G. JONES, JR., ET AL 3,088,034
PHOTOSENSITIVE GROUND TARGET SEEKER
Original Filed Jan. 8, 1957 7 Sheets-Sheet 1
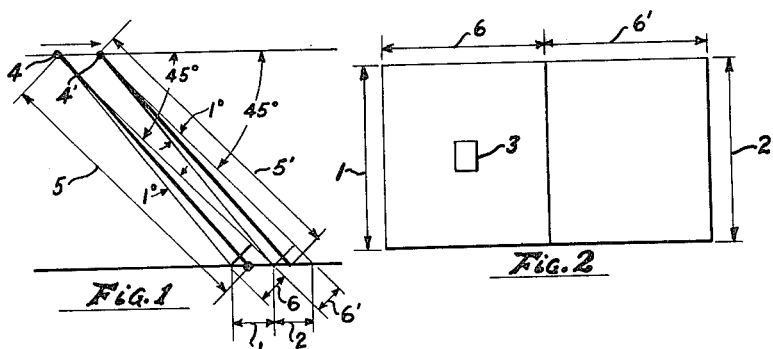
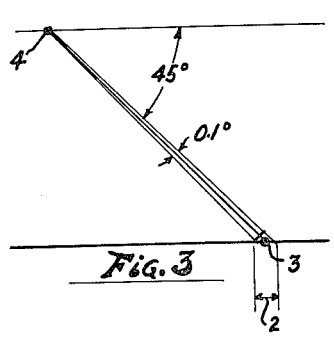
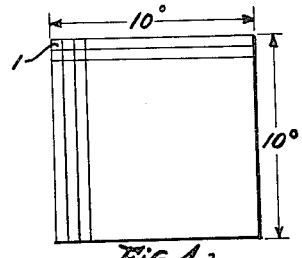
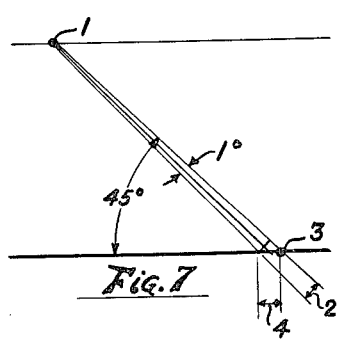
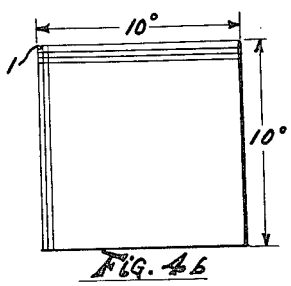
INVENTORS.
THOMAS G. JONES &
FAY E. NULL
BY
ATTORNEYS April 30, 1963  T. G. JONES, JR., ET AL  3,088,034
PHOTOSENSITIVE GROUND TARGET SEEKER
Original Filed Jan. 8, 1957  7 Sheets-Sheet 2

INVENTORS.
THOMAS G. JONES &
FAY E. NULL
BY
Wade Loputz
George Fine
ATTORNEYS

INVENTORS.
THOMAS G. JONES &
FAY E. NULL
BY
ATTORNEYS

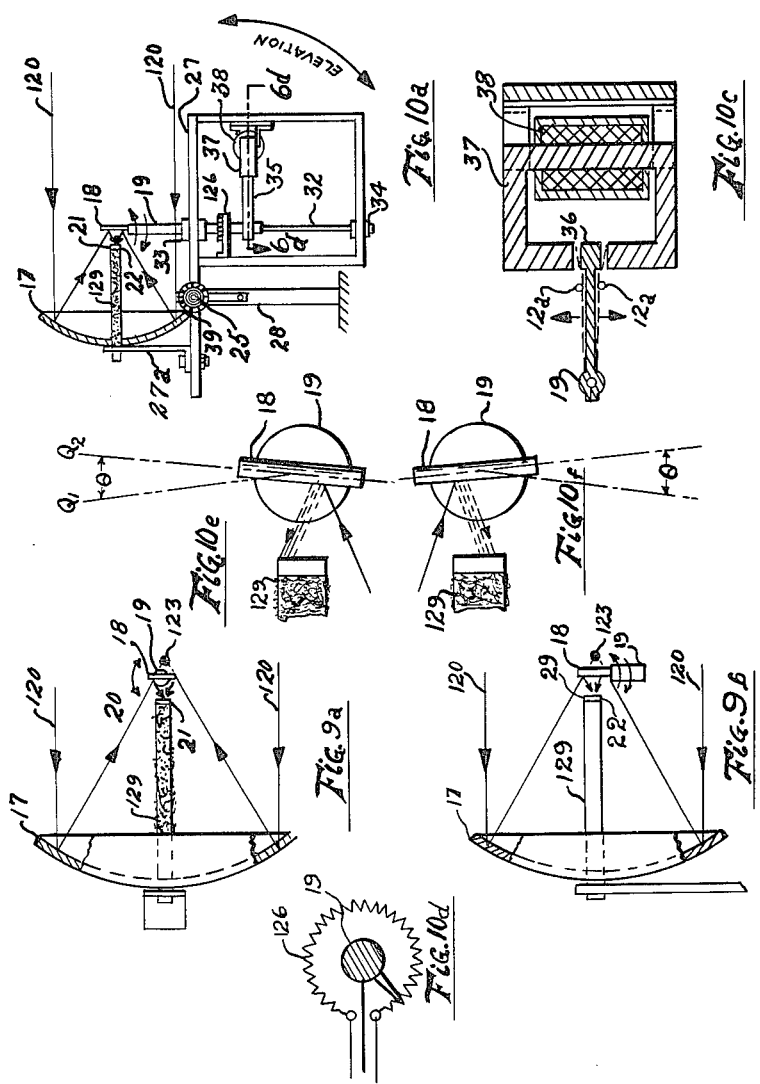

April 30, 1963     T. G. JONES, JR., ET AL     3,088,034
PHOTOSENSITIVE GROUND TARGET SEEKER Original Filed Jan. 8, 1957     7 Sheets-Sheet 5

INVENTORS.
THOMAS G. JONES &
FAY E. NULL

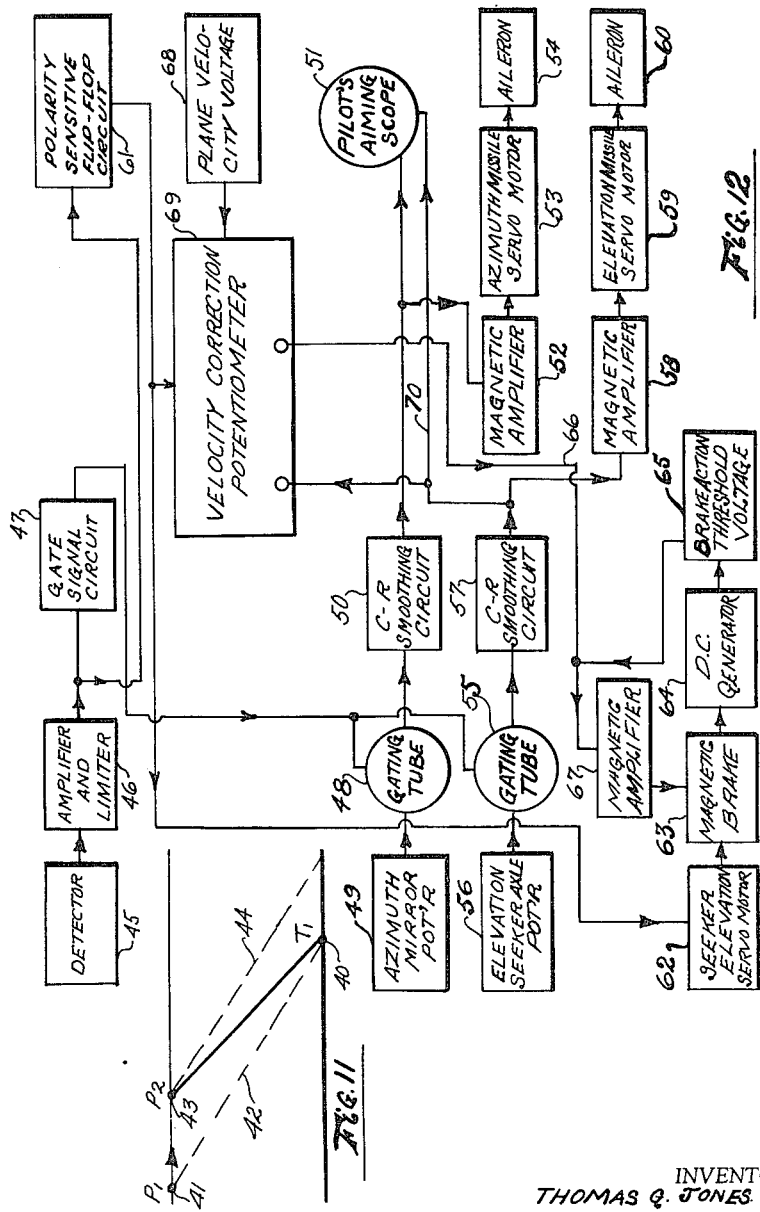

INVENTORS
THOMAS G. JONES & FAY E. NULL
BY
ATTORNEYS 3,088,034
PHOTOSENSITIVE GROUND TARGET SEEKER
Thomas G. Jones, Jr., Springfield, Ohio, and Fay E. Null, Shalimar, Fla., assignors to the United States of America as represented by the Secretary of the Air Force
Original application Jan. 8, 1957, Ser. No. 633,167, now Patent No. 2,951,658, dated Sept. 6, 1960. Divided and this application Feb. 3, 1959, Ser. No. 790,977
2 Claims. (Cl. 250—203)
(Granted under Title 35, U.S. Code (1952), sec. 266)

The invention described herein may be manufactured and used by or for the United States Government for governmental purposes without payment to us of any royalty thereon.

This invention relates to sensing devices, and particularly to the use of radiant energy actuated apparatus for control of a condition or process whose functioning can be monitored by radiant energy.

This invention is particularly suited for air-to-ground seeker applications in that it utilizes the forward motion of the carrier aircraft to scan the terrain. This feature reduces the scan function of the equipment to that of a one dimensional system which in turn permits smaller scan spots for a given frequency limitation of the detector. Because of the heterogeneous radiation characteristics of the terrain backgrounds, small scan spots are necessary for discrimination between target and background signals. Inasmuch as a target will encompass a larger portion of the smaller scan spot area, the resulting signal will be correspondingly greater as compared to the background signal levels. A seeker based on this design affords better target discrimination at greater ranges. The aforesaid seeker includes a novel radiant energy sensing device in which two radiant energy detectors are provided with associated circuitry so that the polarity of their output signal indicates the direction in which a target image leaves the radiant energy detectors.

An object of the present invention is to provide a radiant energy sensing device that has particular utility in connection with methods and apparatus for air-to-ground target seeking which methods and apparatus may utilize either an infrared bomb sight mounted on a plane in level flight or mounted on a missile carried by a plane in level flight. Such a method may, for example, operate by detecting the target and presenting azimuth and elevation signals on a pilot's scope to permit the pilot to aim his plane at the target and to launch the missile when the missile and plane are lined up on the target, and then acts as a seeker to guide the missile to the target.

A further object of the present invention is to provide a novel radiant energy sensing device utilizing a pair of photoconductive detectors producing a signal indicating the direction in which a target image leaves aforesaid infrared detectors.

A further object of the present invention is to provide novel control methods and means including a radiant energy sensing device for utilizing the target signal to gate the pickoff from a potentiometer on the axle of the azimuth scanning mirror proportional to the azimuth position of the target, to the azimuth missile servo controls; and also to use the target signal to gate the pickoff from a potentiometer giving a voltage proportional to the angle between the seeker head and missile axis to the seeker elevation servo controls. The described methods and means function to keep the seeker axis very closely upon the target, so that proportional control is secured for the missile servos in elevation.

These and other objects are hereinafter described in the following explanation of the embodiment illustrated in the accompanying drawings, wherein:

FIG. 1 indicates successive positions of the double line scan that advances with the speed of the plane;

FIG. 2 illustrates the effect of scan spot size on the discrimination of a target from its background;

FIG. 3 illustrates the greatly reduced area of a small angular scan spot;

FIG. 4a shows the number of 1 degree scan spots in a 10 degree square field;

Figure 5:
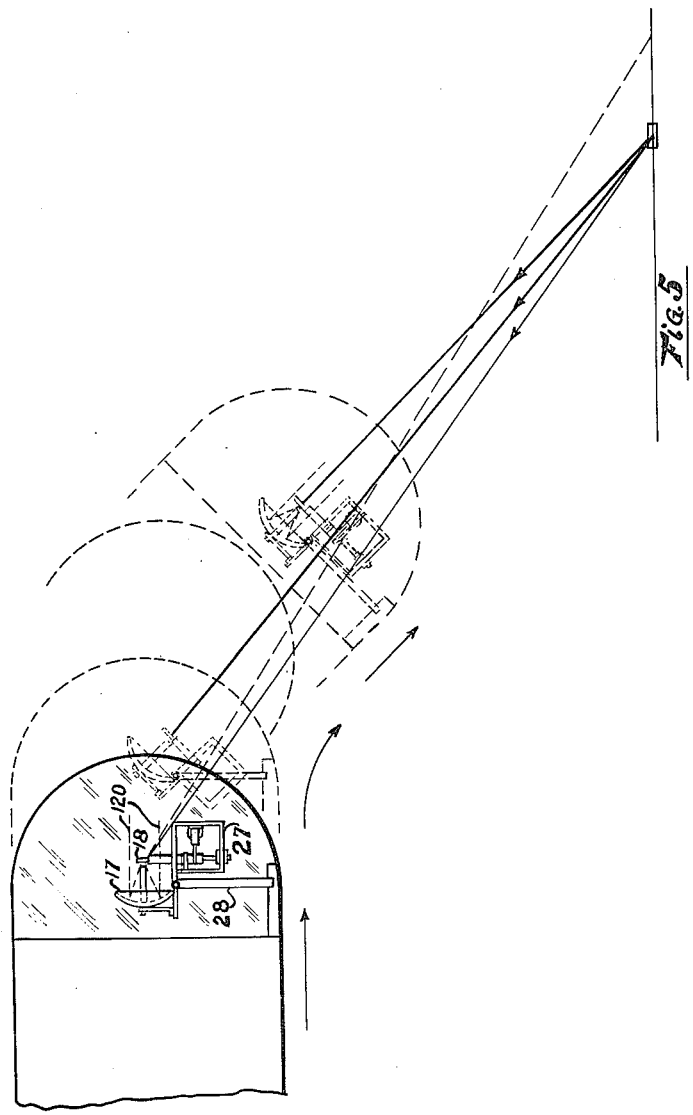
Figure 8:
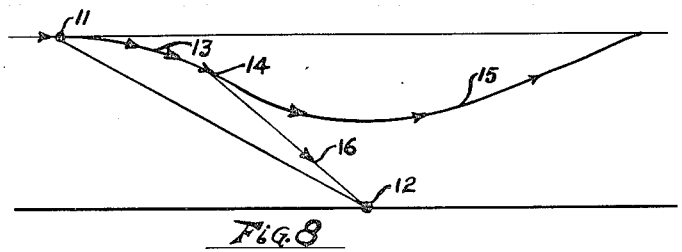
Figure 6:
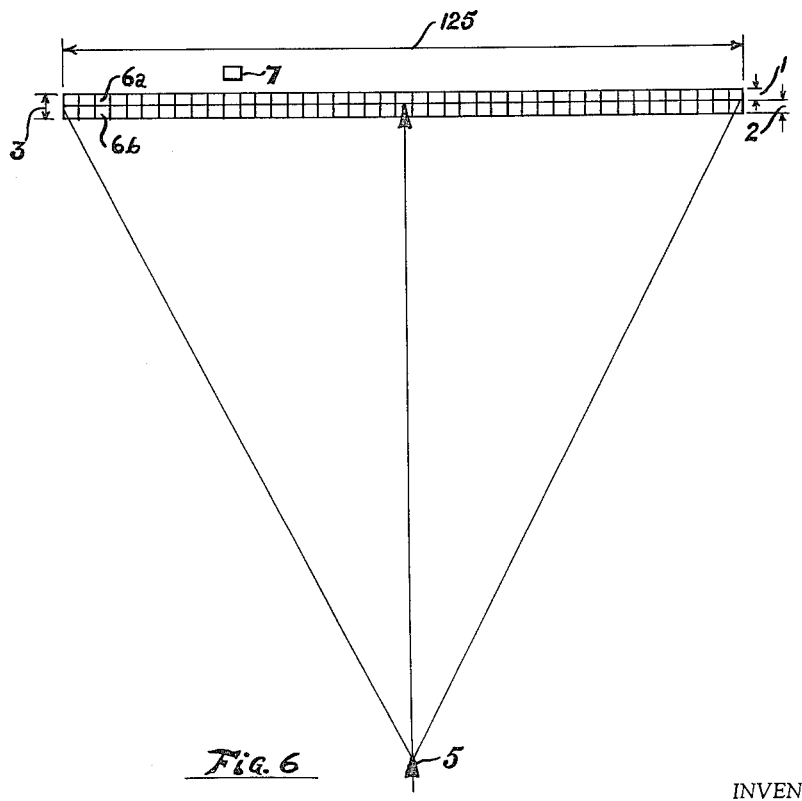
Figure 10B:
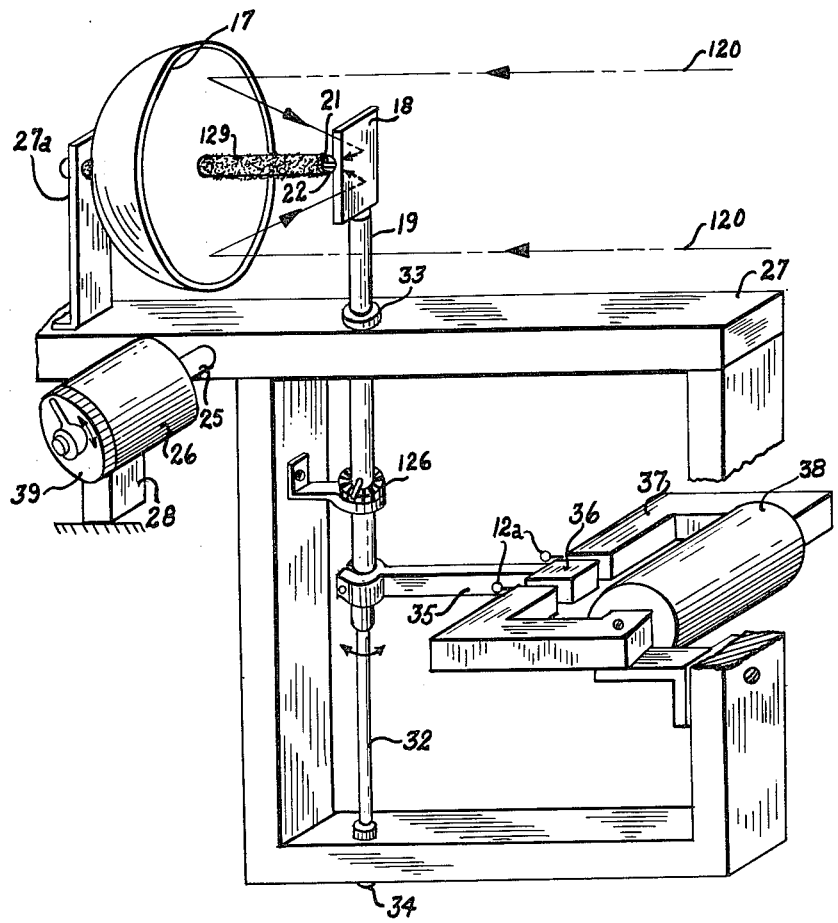

FIG. 4b indicates the numer of 0.1 degree scan spots in a 10 degree field;

FIG. 5 is a schematic representation showing the progress of a missile toward a ground target under the directing influence of control apparatus embodying the invention;

FIG. 6 illustrates the geometry of a double line scan cutting out a strip field of view at the velocity of the plane;

FIG. 7 shows the miss distance of a missile with an error angle of 1 degree when 150 feet from a ground target;

FIG. 8 illustrates the maneuver of a plane in launching a missile;

FIG. 9a shows a top view of the seeker collecting mirror, oscillating azimuth scan mirror and sensitive cell;

FIG. 9b is a side view of the same parts shown in FIG. 9a;

FIGS. 10a and 10b are respectively elevation and perspective views of the target-seeker head assembly and associated mechanism;

FIG. 10c gives a section of the magnetic mirror drive along the line 6d—6d in FIG. 10a;

FIG. 10d shows the pickoff potentiometer for the azimuth scan mirror;

FIGS. 10e and 10f show the extreme limits of the azimuth scan;

FIG. 11 shows the elevation angle through which the seeker head must move to correct for the plane's velocity;

FIG. 12 is a block diagram of the seeker components and functions; and

Figure 13:
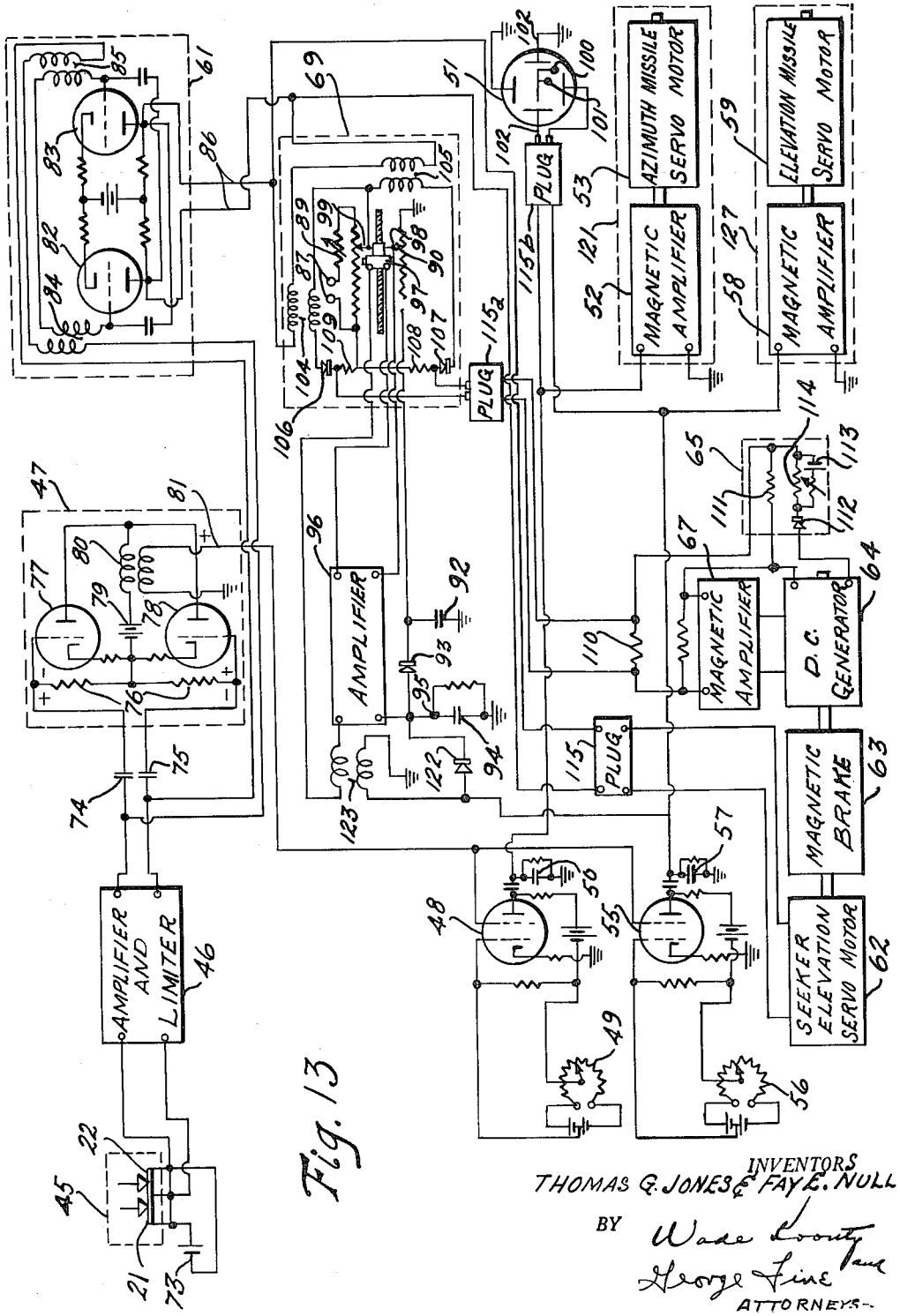

FIG. 13 is a schematic of the electric components, circuits, and functions of the seeker.

The range of tank detection is limited by variations in the optical background. In FIG. 1, 4 and 4' represent successive positions of a plane in level flight. The scan spot from the plane is 1 degree and with a sight line at 45 degrees to the horizontal. The successive slant ranges 5 and 5' represent a distance of 10,000 feet. The successive distances 6 and 6' represent a distance of 174 feet. The distance of each of scan spots 1 and 2 is equal to 246 feet. The area of tank 3 is 150 square feet. In FIG. 2, the distance of each of scan spots 1 and 2 is 246 feet. The distance of each of 6 and 6' is 174 feet. The area of tank 3 is 150 square feet. Thus, consider the scan spots shown in FIGS. 1 and 2. To detect tank 3 the additional scan spot 1 due to the presence of tank 3, must be greater than the background radiation difference between scan spots 2 and 1. Or, for tank detection, the following relation holds:

$$\text{Area Tank} \frac{\text{Radiation Tank}}{\text{sq. ft.}}$$

$$- \frac{\text{Radiation Background from Scan Spot 1}}{\text{sq. ft.}}$$

$$\text{Area Scan Spot} \frac{\text{Radiation Background from Scan Spot 2}}{\text{sq. ft.}}$$

$$- \frac{\text{Radiation Background from Scan Spot 1}}{\text{sq. ft.}}$$

Or expressed in symbols, $$A_T R_T - R_{BG1} \qquad A_S R_{BG2} - R_{BG1}$$

$$\frac{R_T - R_{BG1}}{R_{BG2}} \qquad \frac{A_S}{A_T}, \text{ or}$$

$$R_T - R_{BG1} \frac{A_S}{A_T} R_{BG2} - R_{BG1}$$

and the effective intensity of radiation of the tank above its background must be larger than the background variation by the ratio of the area of the scan spot and tank. Thus, in the example of FIG. 2, the effective radiation from the average square foot of tank surface must exceed that from one square foot of the background by (42,800/150)×Background per square foot, equals 286×Background per square foot (average value).

If the scan spot is reduced to 0.1 degree as indicated in FIG. 3, the tank fills a much larger fraction of the scan spot area, and the optical noise effect is correspondingly reduced. In this case, $$R_T - R_{BG1} \frac{428}{150} R_{BG2} - R_{BG1}$$

or the intensity of effective radiation of the tank above its background only needs to be (428/150)=2.86 times the variation in intensity of optical background as compared with 286 times for the 1 degree scan spot. Optical background noise thus varies as the square of the scan spot dimension.

Unfortunately the scan spot size cannot be reduced at will, since as shown in FIGS. 4a and 4b the number of scan spot positions in the field of view is inversely proportional to the square of the linear dimension of the scan spot. Thus, in FIG. 4a, for 1 degree scan spot there are 100 signal elements per frame as there are 10 scan spot positions in a row and there are 10 rows, or 1000 signal elements per sec. for 10 frames per sec., as probably required for tank tracking. For an 0.1 degree scan spot, as shown in FIG. 4b, there would be 10,000 signal elements per frame as there are 100 scan spot positions in a row and there are 100 rows, or for 10 frames per sec., 100,000 signals per sec. would be required. This high frequency would require the use of either a photoconductive mosaic or an array of photoconductive cells. (A typical sensitive PbS cell is down 3 db at 3,000 cycles per sec.) Photoconductor mosaics are not at present sufficiently sensitive to detect low temperature targets such as tanks. An array of 100 cells, each to sweep 0.1 degree wide swath across the field of view, with a separate preamplifier for each cell, would be very complicated, particularly when it is realized that any variation in the relative sensitivities of separate channels due to change in characteristics in cells or tubes, would act as noise, a difference in sensitivity between channels being indistinguishable from the presence of a target signal in one channel.

It is thus imperative to use a field of view as small as consistent with proper acquisition and tracking of the target. The present invention relates to a seeker for acquiring and tracking a small ground target such as a tank, from the air, with the use of a simple double line scan and a special computer controlled positioning response. The double line scan is oscillated back and forth across the target as actuated by an error signal modified for the effect of the plane velocity and limited in speed by an automatic braking system so as to prevent overshoot and provide stability.

In particular, FIG. 6 shows the use of a double line scan to search from the air for a small ground target such as a tank. By means of a mirror vibrating rapidly at an angle to the course of plane 5, the radiant energy from each scan, spot position 6a is focussed in turn upon one photoconductive detector, while simultaneously the radiant energy from scan spot position 6b in the lower row is focussed in succession upon a second photoconductive cell. This scan pattern is carried forward at the speed of the plane so that any target such as 7 within the swath of width 3 is passed over by the rows of scan spots, 6a and 6b. By the use of only a double row scan pattern the scan spots can be made very small (of the order of magnitude of a small target such as a tank), without exceeding the frequency response of the photoconductive cell. Since a target such as a tank fills a relatively large part of a scan spot it can be detected in spite of variation in the optical background.

However, the dwell time of the double row scan swath on the target would be short for a fast plane. Thus, a plane moving at 800 feet per second in the direction of the target and at a slant range of 10,000 feet from the target, and with a sight line at 45 degrees to the horizontal would have a scan spot swath height (distance 1 plus 2 in FIG. 6) of 49.2 feet for a double line of 0.1 degree scan spots, and would take (49.2/800)=0.0615 second to pass over the target. If the vibrating mirror scanned over the sweep width in 0.02 second, approximately (0.0615/0.02)=3.08 signals would be obtained from the target before it was out of the double scan spot line field of view. To counteract the effect of the speed of the plane the seeker head would have to turn down an angle of approximately 0.14 degree in 0.03 second, requiring an acceleration of 134 degrees per sec. The servo system of a small missile might be able to keep the target on the double line scan before launch of the missile from the plane, but upon launching the missile will suffer an initial oscillation that may have an amplitude of 4 degrees at a frequency of 5 per second. Under these conditions the servo system of such a small missile could not be expected to keep the target in the 0.2 degree wide double line scan. (A field of view of 8 degrees diameter is often used for a seeker without gyro stabilization in order to keep the target in the seeker field of view.) Thus, to insure stability and accuracy in track it is necessary to use a special servo control system.

The signals generated by the target in passing through the double line scan are of opposite polarity for the two scan lines, and if the target leaves the double line scan, the polarity of signal last generated is of proper polarity to actuate the elevation servo to nod the seeker head up or down in a direction to make the double line scan overtake the target. It is desirable for the double line scan to over-take the target rapidly, but this would in general lead to instability as the maximum accelerating force applied for a large error angle would tend to make the double line scan pass over the target at too high a velocity for the deacceleration that occurs after the target passes one scan line to the other, to stop the movement of the double line scan in a small angle.

It is necessary therefore when using a strong servo correction signal to provide an automatic speed limited on the elevation servo control for the seeker head so that it can be stopped by the reverse signal soon after crossing the middle of the double line scan. No harm is done if the target passes out of the double line scan by a small angle so that it oscillates back and forth across the double line scan with a small angular amplitude.

It is necessary to correct for the plane's velocity, however, for if the vibrating mirror that produces the double line scan makes 50 scans (swings) per second, i.e., one scan in 0.02 second, the target must not move across a line scan in less than that time or it might not be hit by the scan spot. Since the scan line is 0.1 degree wide, this corresponds to a maximum average speed of (0.1/0.02)=5 degrees per second. A plane with a horizontal velocity of 800 feet per second would pass over a scan line width under the conditions of FIG. 6 in approximately 0.0305 second, or with an angular velocity of (0.10 degree/0.0305)=3.26 degrees per second. The apparent velocity of the double scan line to the target due to the plane velocity is thus a major fraction of the allowable velocity, and it is necessary to add a correction to the permitted seeker head angular velocity as controlled by regulated braking, to make the permitted rotational speed of the seeker head in elevation greater when moving back toward the target and correspondingly less when moving ahead toward the target. The swath cut by the double line scan is too wide to escape being cut by the double line scan due to plane or missile oscillation, and every time the double line scan passes over the target a grating signal is produced by the lateral mirror scan which connects the pilot's scope to the azimuth and elevation voltages proportional to the angular position of the oscillating mirror axle and the seeker head elevation angle at that instant. The pilot thus notes the azimuth and elevation coordinates of the target in his scope and aims his plane to bring the target image to the zero coordinate position at the center of his scope. After the plane is lined up on the target its velocity no longer produces an asymmetrical signal in elevation. As the target image moves toward the center of the scope of the plane velocity correction is reduced in like proportion. The period of oscillation of the double line scan over the target is little over 0.08 second, 0.04 second to cross the double line scan in one direction, a relatively short time with the target off of the scan line (because of the powerful reversible signal) and 0.04 second for a return across the scan line at the maximum velocity permitted by the brake controls. As a position signal is obtained every time a scan line is crossed, this would give $4(1/0.08)=50$ signals per second. As the aerodynamic controls of a small missile normally require about 0.1 second for operation, 5 correction signals can be averaged by a capacity-resistance network to produce one motion of the aerodynamic controls. Ten guiding signals per second are sufficient for a tank target when the error angle does not exceed 1 degree. Thus, in FIG. 7 if missile 1 at a terminal velocity of 1500 feet per second is 150 feet from target 3 at the time of the last course correction in the last 0.1 second of its flight, the distance 2 will be the angular displacement times the radius or $$(1/57.3) \times 150 = 2.62 \text{ feet}$$

and the horizontal miss distance 123, =3.69 feet. With a scan spot position location of 0.1 degree in both azimuth and elevation, the miss should be smaller than the above value.

If the seeker is on a fighter as at 11 in FIG. 8, with a tank 12 the plane can be aimed at the tank along course 13, and 14, and pulled up along 15, while the missile is launched on course 16 and guided by the double line scan seeker to the target at 12. Before launch the azimuth and elevation error signals go to the pilot's aiming scope, and the azimuth correction signal also goes to the azimuth missile servo controls, but the azimuth signal has nearly zero guidance effect as the missile is rigidly attached to the plane. Likewise, a correction signal proportional to the angle between the seeker axis and the missile axis goes to the missile elevation servo controls prior to launch for guidance of the missile immediately after launch. At launch, connections to the pilot's scope are broken, and the low inertia seeker head tracks the target rapidly enough to overcome the missile oscillation. Smoothing resistance-capacity networks average out the variations in the angles between the missile axis and azimuth angle to the target, and between the missile axis and elevation angle to the target as determined by the seeker head axis. The pilot's aiming scope may also be used as a bombadier's image tube sight in a conventional bombing system with the plane in horizontal flight.

FIGS. 9a and 9b show the seeker optics and azimuth scan system. A small F number system is needed so that the image of a distant approximately point target will be concentrated in a small area. Aberrations must be small both for the purpose of concentrating the image and to obtain an 0.1 degree resolution. A Mangin collecting mirror 17 may be used for a small F number and with small aberrations.

Rays 120 from the junction of the upper and lower scan spot lines of the double line scan would be brought to a focus at point 123 if the plane mirror 18 were not interposed in their path. Azimuth scan mirror 18 reflects the rays to a focus at image 20 on the boundary between detector cells 21 and 22. In like manner, the image of a lower scan spot is brought to focus on cell 22 and that of an upper scan spot on cell 21. Cells 21 and 22 are held by support 129 close to mirror 18 which can thus be small and readily oscillated about the axis of rod 19. To prevent spurious reflections from support 129 it is made of an infrared absorbing glass covered with a non-reflecting coating for the infrared in the cell sensitivity range so that it acts as a light trap for this band of infrared. The shadow of support 129 is not in focus on the image of the scan spot at cells 21 or 22. As azimuth scan mirror 18 oscillates about the axis of vertical rod 19, each scan spot 6a in the upper row of the double line scan 125 (FIG. 6) is focused on cell 21 in succession, and each scan spot 6b in the lower row of the double line scan 125 is focused on cell 22 in succession. If possible the cells 21 and 22 are as small as the scan spot images to obtain a favorable signal/noise ratio. If this condition cannot be obtained, small apertures are placed in front of the cells 21 and 22 of the same size as the desired angular dimensions of the scan spot and in its image plane.

As indicated in FIGS. 10a and 10b, the target seeker assembly includes a supporting rectangular frame 27 pivoted about the longitudinal axis of the shaft 25 of a position-controlling servo motor 26, carrying a potentiometer type of indicator 39 to show the degree of tilt frame 27 relative to airframe 28. Mangin mirror 17 is supported by bracket 27a.

Azimuth scan mirror 18 is centered on the axis of rod 19 which is supported by ball bearings 33 and attached to torsion rod 32 which is fixed at the bottom end 34. In FIG. 10c, rod 19 is oscillated by the drive arm 35 which supports the permanent magnet armature 36, oscillated by A.C. flux in the iron core 37 as produced by an A.C. current through coil 38 with its frequency controlled to produce the proper amount of resonance with the natural frequency of oscillation of the torsion rod system (as shown in FIGS. 10a and 10b) comprising rod 19, mirror 18, drive bar 35, and torsion rod 32, to produce the angular oscillation of mirror 18 that causes the scan 125 in FIG. 6 of the desired amount. The resilient stops 12a prevent damage by excessive amplitude of oscillation. Potentiometer 126 (as shown in FIGS. 10a, 10b, and 10d) gives a voltage proportional to the angular position of the top of rod 19. Rod 32 is of small diameter so that it can be twisted 5 degrees by a relatively small armature force when resonance is approached. Rod 19 is stiff enough to oscillate light mirror 18 by difference in the angle of twist at potentiometer 126 and mirror 18. Potentiometer 126 thus gives a voltage proportional to the angular position of mirror 18 with respect to airframe 28. FIGS. 10e and 10f show the extreme limits of azimuth scan as determined by aforementioned torsion rod system.

FIG. 11 illustrates the acquisition of the target $T_1$ at 40. The attacking plane 41 at $P_1$ is flying horizontally, the double line scan 3 projected onto the ground along direction 42 and moving a search path over the ground at the speed of the plane. When the plane has reached position $P_2$ at 43 the double line scan would have moved to point in the direction 44 if the target had not been encountered.

Upon passage of the double line scan over the target, however, the correction signal applied to make the seeker head nod downward and hold on the target is increased by a factor proportional to the velocity of the plane so that the double line scan passes back over the target at the maximum speed that still allows an azimuth signal to be picked up.

FIG. 12 shows a block diagram of the seeker components and functions. When the double line scan passes over the target, a pulse signal is generated and then detected at 45. This is amplified and limited in magnitude by amplifier limiter 46, the gate signal circuit 47 giving the same polarity signal regardless of the output of amplifier limiter 46. This gating signal is applied to tube 48, which allows the output of the potentiometer 49 on the azimuth mirror axle to pass an output proportional to the azimuth position of the target, to condenser-resistor smoothing network 50 and hence to azimuth deflecting plates of the pilot's scope 51, and also to the magnetic amplifier 52, the azimuth missile servo motor 53, and hence to the azimuth missile aileron 54. The missile controls have no effect until after launch but are correcting the instant of launch. Likewise, the gate signal circuit 47 gates tube 55 allowing the output from potentiometer 56 on the elevation seeker axle to pass a voltage proportional to the elevation position of the seeker axis relative to the missile axis, to pass to the condenser-resistance smoothing network 57 and hence to the elevation deflecting plates of the pilot's aiming scope 51, and also to magnetic amplifier 58, elevation missile servo motor 59, and missile elevation aileron 60. The missile controls do not of course become effective until after launch.

The seeker head elevation servo correction originates from amplifier and limiter 46 and passes plus and minus polarity signals to polarity sensitive flip-flop circuit 61 which supplies a fixed D.C. voltage output in the interval between signal pulses and of a polarity determined by which line of the double line scan the target last passed over. These plus and minus fixed voltages are amplified and produce powerful driving torques on elevation seeker servo motor 62 that is sufficient to bring the double line scan back over the target at a much greater speed than could be tolerated either for stability or for permitting the target to be picked up by the azimuth mirror. Brake 63 is thus provided to limit the velocity of the seeker axis in elevation to the permissible value with respect to the target, which corresponds to a variable velocity with respect to the seeker axis, depending upon the plane velocity. Tachometer type D.C. generator 64 produces no braking action until its voltage exceeds that of calibrated threshold circuit 65; the output of 65 is then modified by a voltage proportional to the plane velocity correction on lead 66 and the resultant impressed on magnetic amplifier 67 that regulates the braking action of 63. The correction for the plane's velocity has its origin in a voltage from plane velocity potentiometer 68 that can be manually or automatically adjusted. Automatic potentiometer balancing circuit 69 passes to lead 66 that fraction of the voltage maximum velocity correction that corresponds to the ratio of the instantaneous and initial elevation axle displacement voltages from lead 70, i.e., to the angle between the seeker axis and the axis of the plane or missile, so that when the plane is flying a level horizontal course, the full plane velocity correction will be made, and when the plane axis is lined up on the target, no velocity correction is given, and with other plane velocity corrections proportional to the condition between these extremes.

FIG. 13 is a schematic of the electrical circuit. Detector 45 contains the two photoconductive cells 21 and 22 connected in series with bias voltage 73, the IR drop across cell 22 being impressed on conventional amplifier and signal limiter 46. The output of signal limiter 46 is impressed through isolating condensers 74 and 75 to gate signal circuit 47. Resistor 76 divides the input voltage on tubes 77 and 78 so that opposite polarities are impressed on tubes 77 and 78 with a common plate voltage source 79 and transformer primary of 80 as a common load. Thus, regardless of the input polarity on signal circuit 47 the voltage output on lead 81 will always have the same polarity and is made positive by connection to the proper terminal of the secondary of transformer 80. Lead 81 applies a gating voltage on tubes 48 and 55 when a signal pulse is received by the passage of the target image over one of the cells 21 or 22 of detector 45. The gating voltages impressed on the screen grids of tubes 48 and 55 are approximately constant due to the section of the limiter 46 and of sufficient value to allow the control grids to substantially determine the current flow in tubes 48 and 55. Azimuth scan mirror axle potentiometer 49 impresses a voltage on the control grid of tube 48 so that it is proportional to the deflection of azimuth scan mirror 18 at the instant the target image is passing over one of the cells 21 or 22. The output from tube 48 is in series with capacity-resistance smoothing network 50, whose output goes to the azimuth deflecting plates of pilot's scope 51 and to azimuth missile servo 121 comprising amplifier 52 and servo motor 53.

In the same manner tube 55 receives a positive gating pulse that passes a voltage proportional to the elevation angle between the seeker axis and the missile axis, the missile axis being bore-sighted with the plane axis before launch. The output from tube 55 is impressed on smoothing capacity-resistance network 57 whose output is impressed on the elevation deflection plates of pilot's aiming scope 51 (before launch), and also to elevation missile servo 127 comprising amplifier 58 and servo motor 59.

Seeker elevation servo motor 62 requires a sustained signal in the interval between signal pulses. This voltage is a constant, high value whose polarity must correspond to the last cell 21 or 22 that the target image passes over. This is provided by a polarity sensitive flip-flop circuit 61 with the plate of tube 82 coupled to the grid of tube 83, and the plate of 83 coupled to the grid of 82, and the transformers 84 and 85 with their primaries in series with output of amplifier and limiter 46 and with the secondaries wound in opposite directions so that a positive pulse from limiter 46 has a sufficient positive magnitude on the grid of tube 82 and a negative pulse on the grid of tube 83, to drive tube 82 to saturation and tube 83 to cutoff. The voltage on the grid of tube 82 will then remain strongly positive, since the plate of tube 83 is at a relatively high potential when not drawing current, and the grid of tube 83 will be locked negative since the positive voltage from the plate of tube 82 is decreased when the tube draws current, and under this condition the cathode resistor of tube 83 is large enough to drive it to cutoff. Thus, the output leads 86 of flip-flop circuit 61 carry a voltage of constant polarity after a given pulse until a pulse of opposite polarity occurs on the output of amplifier and limiter 46. Circuit 69 supplies voltage on potentiometer 88 which can be calibrated by variable resistor 89, which is varied manually or automatically corresponding to the plane velocity. Potentiometer 90 has a voltage impressed across its high resistance equal to the voltage condenser 92 above earth when charged through rectifier 93 from the output of a capacity-resistance network 57 when the first target signal trips tube 55, the time constant of capacitor 92 and potentiometer 90 being long enough to prevent any appreciable discharge in the time between signals. The capacity-resistance network 94 has a short enough time constant so that the voltage at point 95 corresponds to that of the last signal from capacitor-resistor network 57. The pickoff voltage from potentiometer 90 is bucked against that from capacity-resistor network 94 at point 95 and the result impressed on the input of differential amplifier 96, the output of amplifier 96 going to servo motor 97 to move rotors 98 and 99 (which are mechanically attached but electrically insulated) toward the left (decreasing pickoff voltage) until the pickoff voltage from potentiometer 90 is equal to the voltage on capacity-resistor network 94. The pickoff point on potentiometer 90 is thus slaved to follow the fraction represented by the ratio of the last signal from capacity-resistor network 57 compared to the initial signal, and since these voltages are proportional to the elevation angle between the target direction (followed by the seeker axis) and the missile axis, this ratio is proportional to the ratio of the distances 101 to 100 on pilot's scope 51, of the target given position to the target initial position from the horizontal coordinate line 102—102 of the scope. As pickoff 99 of potentiometer 88 moves with pickoff 98 of potentiometer 90, the plane correction voltage picked off from pickoff 99 is also proportional to distances 101 to 100.

The leads 87 have an A.C. voltage of the correct amplitude for the plane velocity correction, but which must be converted to a D.C. voltage of the proper polarity. For that purpose the voltage is applied to parallel circuits each of which contains a gating impedance transformer 104 or 105, a rectifier 106 or 107, and resistors 108 or 109, so that current only flows in one of these parallel circuits when a gating signal is obtained from transformer 104 or 105, which have primary coils wound in opposite directions and both in series with a circuit across the voltage output of leads 86. Thus, the polarity of the voltage on leads 86 determines whether the upper or lower circuit of 69 passes current, and hence the polarity of the correction voltage picked off from resistors 108 and 109 in series, and which is impressed on resistor 110, as the corrected voltage for the plane velocity. Tachometer type generator 64 is driven at a speed proportional to that of fluid magnetic clutch brake 63 and elevation seeker axle servo motor 62. As long as the motor speed does not exceed the given permissible value the voltage of the generator is below that of threshold circuit 65 and no current flows through resistor 111, since rectifier 112 only allows the current to flow in one direction and battery 113 prevents its flow until the threshold value is larger than that across resistor 114. When the speed of motor 62 slightly exceeds the desired value, current flows in resistor 111 and the voltage across resistor 110 is added or subtracted from this value (depending upon the polarity) to give the resultant braking signal to magnetic amplifier 67 which produces a proportional and powerful braking action on magnetic brake 63 to limit the speed of servo motor 62 to the permissible value.

After the launching of the missible from the plane, the velocity correction is no longer needed as the seeker axis points at the target and the missile axis is kept approximately on the target. Upon launching of the missile the circuit 69 that furnishes the plane velocity voltage correction is automatically interrupted due to the separation of the inter-fitting parts of disconnect plug 115a, so that the error voltages driving the seeker servo motor in elevation are symmetrical and of a sufficient constant value of magnitude to rapidly drive the double line scan back on the target, with regulated braking of the servo motor velocity to a set fixed value with respect to the target. Also upon launching, the pilot's aiming scope 51 is disconnected automatically due to the separation of the inter-fitting parts of disconnect plug 115b.

Scanning over two narrow strips (double line scan) of the field of view rather than over an area has the great advantage that the size of the scan spots in the narrow strips may be greatly reduced without increasing the number of elements scanned per second beyond the frequency response of the detecting cells. The unusually small scan spots provide increased discrimination against the optical background of the target with corresponding increase in range.

To make possible the above advantage the double line scan of the seeker head must closely track the target in elevation angle. The seeker elevation tracking servo system has the advantage over conventional systems in that it is capable of accurate target tracking with only a double line scan, which incorporates a powerful corrective drive the instant the target leaves the scan line, but prevents overshoot by an automatic, electronically controlled braking system that prevents the relative velocity of correction between scan line and target from exceeding a set value, which always returns the servo system to the same reference condition and prevents excessive overshoot and unstable oscillations.

A correction to the braking system of the seeker head elevation controls for the apparent angular motion of the target due to the plane's velocity, allows the relative velocity of the double scan line and target to be the same when the double scan line swings back toward the target (in its small oscillation about the target) from in front or behind, so that the target is more accurately positioned in the center of the oscillation.

A threshold voltage (representing servo motor velocity) detector circuit with a rectifier and bucking voltage source has the advantage that no voltage appears on the pickoff resistor until the threshold voltage is reached, and then the change is much more rapid than with say a tube biased to cutoff for which the current changes slowly with voltage near cutoff.

The advantage of using the approximately linear portion of the oscillation of a mirror vibrating in angular harmonic motion in resonance with an electro-magnetic drive is that it can have quite a high speed of oscillation with a small amount of vibration and the expenditure of little power.

The advantage in the optical system of a seeker, in placing the detector cells close to the oscillating scan mirror which in turn is a small distance outside the focal point of the collecting mirror is that it allows the scan mirror to be small so that it is easily vibrated and does not obstruct an appreciable fraction of the aperture of the collecting mirror. By mounting the cells on a support of infrared absorbing material with a non-reflective coating spurious reflections are prevented.

This application is a division of our co-pending patent application Serial No. 633,167, filed January 8, 1957, now Patent No. 2,951,658.

What is claimed is:

1. An airborne radiant energy sensing device comprising, in combination, two photoconductive detector cells connected in series with a bias voltage, said combination being airborne, means to scan in azimuth a ground area from a flying object in a double line for a radiant energy, moving ground target such as a tank, said double line scan having a rate of progression commensurate with the velocity of said flying object, means to focus said radiant energy from one of said double line scans on one of said detector cells and the other of said double line scans upon the other of said detector cells, signal pickoff means associated with one of said cells, and means for causing said pickoff means to produce signals of the opposite polarity so that the polarity of the signal indicates the direction in which the target image of said moving ground target leaves said cells when moving along a line intercepting both of said cells.

2. An airborne radiant energy sensing device comprising, in combination, a pair of photoconductive detectors, a voltage source in series with said detectors, means to scan in azimuth a ground area from a flying object in a double line for a radiant energy moving ground target such as a tank, said double line scan having a rate of progression commensurate with the velocity of said flying object, means to focus said radiant energy from one of said double line scans upon one of said detectors and the other of said double line scans upon the other of said detectors, and signal pickoff means to produce a signal from said detectors so that the polarity of said signal indicates the direction in which said moving ground target leaves said pair of line scans.

References Cited in the file of this patent

UNITED STATES PATENTS

| | | |
|---|---|---|
| 2,392,873 | Zahl | Jan. 15, 1946 |
| 2,489,223 | Herbold | Nov. 22, 1949 |

(Other references on following page)

UNITED STATES PATENTS

| | | |
|---|---|---|
| 2,721,275 | Jackson | Oct. 18, 1955 |
| 2,740,901 | Graham | Apr. 3, 1956 |
| 2,774,961 | Orlando | Dec. 18, 1956 |
| 2,878,712 | Blackstone et al. | Mar. 24, 1959 |
| 2,999,161 | Lovoff | Sept. 5, 1961 |
| 3,000,256 | Hyde | Sept. 19, 1961 |

FOREIGN PATENTS

| | | |
|---|---|---|
| 470,846 | Great Britain | Aug. 23, 1937 |

OTHER REFERENCES

Development and Operating Characteristics of Thermistor Bolometers, by J. A. Becker et al., O.S.R.D. No. 5991, May 1946, FIG. 4.2 relied on.